(12) United States Patent
Nagar et al.

(10) Patent No.: US 11,906,108 B1
(45) Date of Patent: Feb. 20, 2024

(54) BELT TRAP WITH INTEGRATED TENSIONER

(71) Applicant: DEERE & COMPANY, Moline, IL (US)

(72) Inventors: Dharmendra Nagar, Pune (IN); Abhilash Sahoo, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/156,577

(22) Filed: Jan. 19, 2023

Related U.S. Application Data

(60) Provisional application No. 63/369,829, filed on Jul. 29, 2022.

(51) Int. Cl.

| | |
|---|---|
| *F16P 7/00* | (2006.01) |
| *F16H 57/00* | (2012.01) |
| *F16H 7/02* | (2006.01) |
| *F16H 7/08* | (2006.01) |
| *F16H 7/12* | (2006.01) |

(52) U.S. Cl.
CPC ............ *F16P 7/00* (2013.01); *F16H 7/02* (2013.01); *F16H 57/00* (2013.01); *F16H 7/12* (2013.01); *F16H 2007/0865* (2013.01); *F16H 2007/0897* (2013.01)

(58) Field of Classification Search
CPC ..... F16H 7/18; F16H 7/02; F16H 7/24; F16H 7/12; F16H 2007/0865; F16H 2007/0897
USPC ................................. 474/144, 135
See application file for complete search history.

(56) References Cited

U.S. PATENT DOCUMENTS

| | | | | |
|---|---|---|---|---|
| 582,096 | A * | 5/1897 | Rominger | B62J 13/02 474/144 |
| 1,717,431 | A * | 6/1929 | Blanchard | B23Q 5/14 474/144 |
| 2,862,569 | A * | 12/1958 | Strunk | B60K 17/08 474/144 |
| 3,762,229 | A * | 10/1973 | Johnson | F16H 9/06 474/120 |
| 3,885,471 | A * | 5/1975 | Morine | F16P 1/02 474/144 |
| 4,023,429 | A * | 5/1977 | Davies, III | F16H 7/0827 474/140 |
| 4,742,649 | A * | 5/1988 | Fuchs | B24B 21/18 474/135 |
| 4,781,665 | A * | 11/1988 | Walker | F16H 7/129 474/135 |

(Continued)

OTHER PUBLICATIONS

06L903133 D / 06K903133A Accessory Belt Tensioner Assembly for VW Audi Seat, pp. 1-14, [online]. Retrieved from the Internet <URL: https://yibaiauto.en.made-in-china.com/product/jZtTHKGuXhcP/China-06L903133-D-06K903133A-Accessory-Belt-Tensioner-Assembly-for-VW-Audi-Seat.html>.

(Continued)

*Primary Examiner* — Henry Y Liu

(57) ABSTRACT

Belt traps for a belt drive system include a bracket configured to receive at least a portion of a pulley to capture a failed drive belt between the bracket and a pulley. The pulley may be a tensioner pulley and may be biased in a direction towards the bracket. The bracket may include a relief portion configured to receive at least a portion of the pulley. The relief portion may include an opening or a recess that is sized and shaped to receive at least a portion of the pulley.

20 Claims, 9 Drawing Sheets

(56) References Cited

U.S. PATENT DOCUMENTS

| | | | | |
|---|---|---|---|---|
| 5,067,930 | A * | 11/1991 | Morales | B62J 13/00 474/144 |
| 5,580,325 | A * | 12/1996 | Hirota | F02B 77/081 474/144 |
| 6,238,312 | B1 * | 5/2001 | Tsubata | F16H 57/0489 474/146 |
| 6,652,336 | B1 * | 11/2003 | Chambers | F16H 7/1263 474/135 |
| 7,690,407 | B2 * | 4/2010 | Annala | A01G 23/091 144/4.1 |
| 7,704,174 | B2 * | 4/2010 | Takada | F01M 9/06 440/88 L |
| 7,771,303 | B2 * | 8/2010 | Fuse | F16H 7/18 474/140 |
| 8,105,193 | B2 * | 1/2012 | Oseto | B62M 9/126 474/82 |
| 8,425,356 | B2 * | 4/2013 | Vachal | F16H 7/18 474/131 |
| 11,408,499 | B2 * | 8/2022 | Blomdahl | F16H 57/0453 |
| 2002/0042316 | A1 * | 4/2002 | Young, Jr. | B62J 13/00 474/140 |
| 2002/0160869 | A1 * | 10/2002 | Barnett | B62M 9/138 474/144 |
| 2002/0183149 | A1 * | 12/2002 | Temma | F16H 61/66272 474/3 |
| 2004/0043854 | A1 * | 3/2004 | Fraley, Jr. | B62D 5/0424 474/134 |
| 2004/0102267 | A1 * | 5/2004 | Murakami | F16H 7/1281 474/69 |
| 2006/0270503 | A1 * | 11/2006 | Suzuki | F16H 57/0415 474/93 |
| 2007/0032324 | A1 * | 2/2007 | Uchiyama | B62M 9/16 474/140 |
| 2007/0265121 | A1 * | 11/2007 | Gross | B62J 13/00 474/144 |
| 2008/0227573 | A1 * | 9/2008 | Strombeck | B62J 13/00 474/144 |
| 2009/0298631 | A1 * | 12/2009 | Jud | F02B 67/06 474/135 |
| 2011/0251003 | A1 * | 10/2011 | Nishimiya | F16H 7/02 474/144 |
| 2011/0256971 | A1 * | 10/2011 | Kilshaw | B62M 9/04 474/134 |
| 2012/0088618 | A1 * | 4/2012 | Scolari | B62M 9/04 474/135 |
| 2015/0043942 | A1 * | 2/2015 | Okuno | G03G 15/757 399/167 |
| 2015/0259030 | A1 * | 9/2015 | Nakano | F16H 7/18 474/144 |
| 2019/0136961 | A1 * | 5/2019 | Blomdahl | F16H 57/0453 |

OTHER PUBLICATIONS

Peugeot 206 1.4 16V V Belt Tensioner, pp. 1-3, [online]. Retrieved from the Internet <URL: https://www.gumtree.co.za/a-car-engines-engine-parts/randburg/peugeot-206-1-4-16v-v-belt-tensioner/1008282109250911164423709>.

* cited by examiner

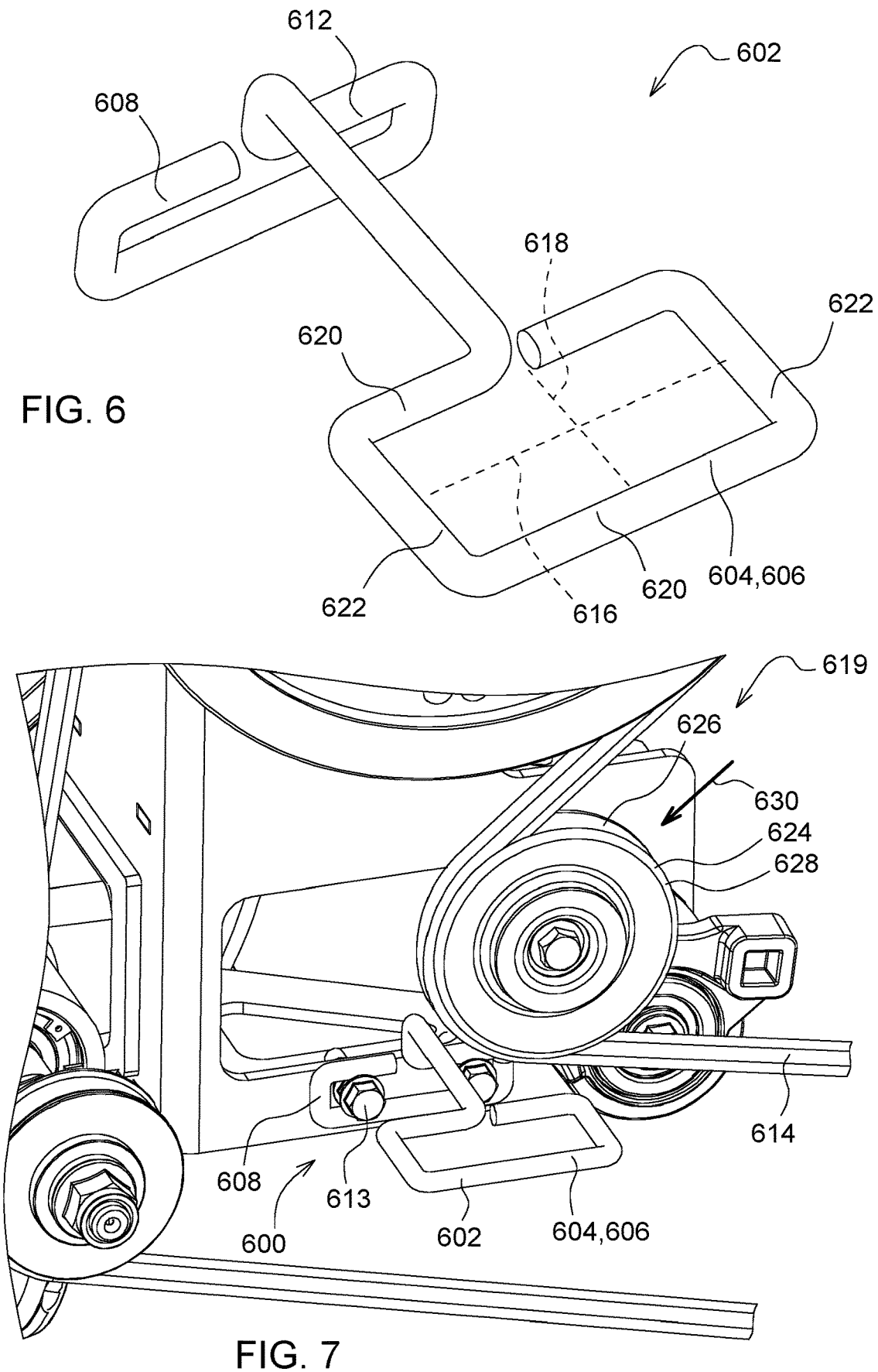

BELT TRAP WITH INTEGRATED TENSIONER

CROSS REFERENCE TO RELATED APPLICATIONS

This application claims the benefit of U.S. Provisional Application No. 63/369,829, filed Jul. 29, 2022, the entire contents of which are incorporated herein by reference.

FIELD OF THE DISCLOSURE

The present disclosure relates generally to belt drive systems and, particularly, to belt traps to arrest or otherwise absorb energy of a severed or broken drive belt during operation of the belt drive system.

BACKGROUND OF THE DISCLOSURE

Belt drive systems are used to transmit mechanical power between rotating shafts. In some instances, the belt drives control speed and torque transmitted to the rotating shafts.

SUMMARY OF THE DISCLOSURE

A first aspect of the present disclosure is directed to a belt trap. The belt trap may include a movable pulley configured to carry an endless drive belt, the pulley rotatable about an axis of rotation and a bracket disposed adjacent to the pulley and defining a relief portion sized and shaped to receive at least a portion of the pulley. The pulley may be movable from a first position corresponding to an operational configuration to a second position corresponding to an arresting configuration in which a portion of the pulley is received into the relief portion of the bracket.

Another aspect of the present disclosure is directed to a belt drive system. The belt drive system may include an endless drive belt moveable along a circuitous route; a drive pulley that drives the endless drive belt along the circuitous route; and a belt trap. The belt trap may include a tensioner pulley biased in a first direction by a biasing force to introduce tension in the endless drive belt and movable from a first position to a second position and a bracket disposed adjacent to the tensioner pulley. The tensioner pulley may include a peripheral edge and a groove formed in the peripheral edge that receives a portion of the endless drive belt. The tensioner pulley may be rotatable in a first rotational direction about an axis. The bracket may include a relief portion that receives a portion of the peripheral edge of the tensioner pulley when the endless drive belt fails so as to trap the failed endless drive belt between the tensioner pulley and the bracket. The pulley may be biased towards the second position.

The various aspects may include one or more of the following features. The relief portion may include a pocket formed in bracket. The relief portion may include a recess formed in the bracket. The bracket may define a peripheral edge, and the recess may be formed in the peripheral edge. The pulley may include a tensioner pulley. The relief portion may define a shape having a major axis and a minor axis. A length of the major axis may be larger than a length of the minor axis, and the minor axis may be parallel to the axis of rotation. The bracket may include tabs disposed at opposing ends of the relief portion. The tabs may be sized to engage with a peripheral edge of the pulley when the pulley is moved into the second position. The bracket may include a notch formed into at least one of the tabs. The notch may have a V-shape, a rectilinear shape, or a tapered shape. The notch may be sized to receive the endless drive belt when the pulley is at the first position.

The various aspects may include one or more of the following features. The tensioner pulley may be movable from the first position to the second position, in response to the biasing force, upon failure of the endless drive belt. A portion of the tensioner pulley may be receivable into the relief portion in response to movement of the tensioner pulley to the second position upon failure of the endless drive belt. Receipt of the tensioner pulley into the relief portion may clamp the endless drive belt between the tensioner pulley and the bracket. The bracket may include tabs disposed at opposing ends of the relief portion. The tensioner pulley may be movable from the first position to the second position in response to failure of the endless drive belt. The bracket may include a notch formed into at least one of the tabs, and the endless drive belt may be receivable within the notch when the tensioner pulley is at the first position.

Other features and aspects will become apparent by consideration of the detailed description and accompanying drawings.

BRIEF DESCRIPTION OF THE DRAWINGS

The detailed description of the drawings refers to the accompanying figures in which:

FIG. 6 is an oblique view of another example bracket that forms part of a belt trap, according to some implementations of the present disclosure.

FIG. 7 is an oblique view of an example belt trap of a belt drive system in which the belt trap includes the bracket of FIG. 6.

DETAILED DESCRIPTION

Figure 1:
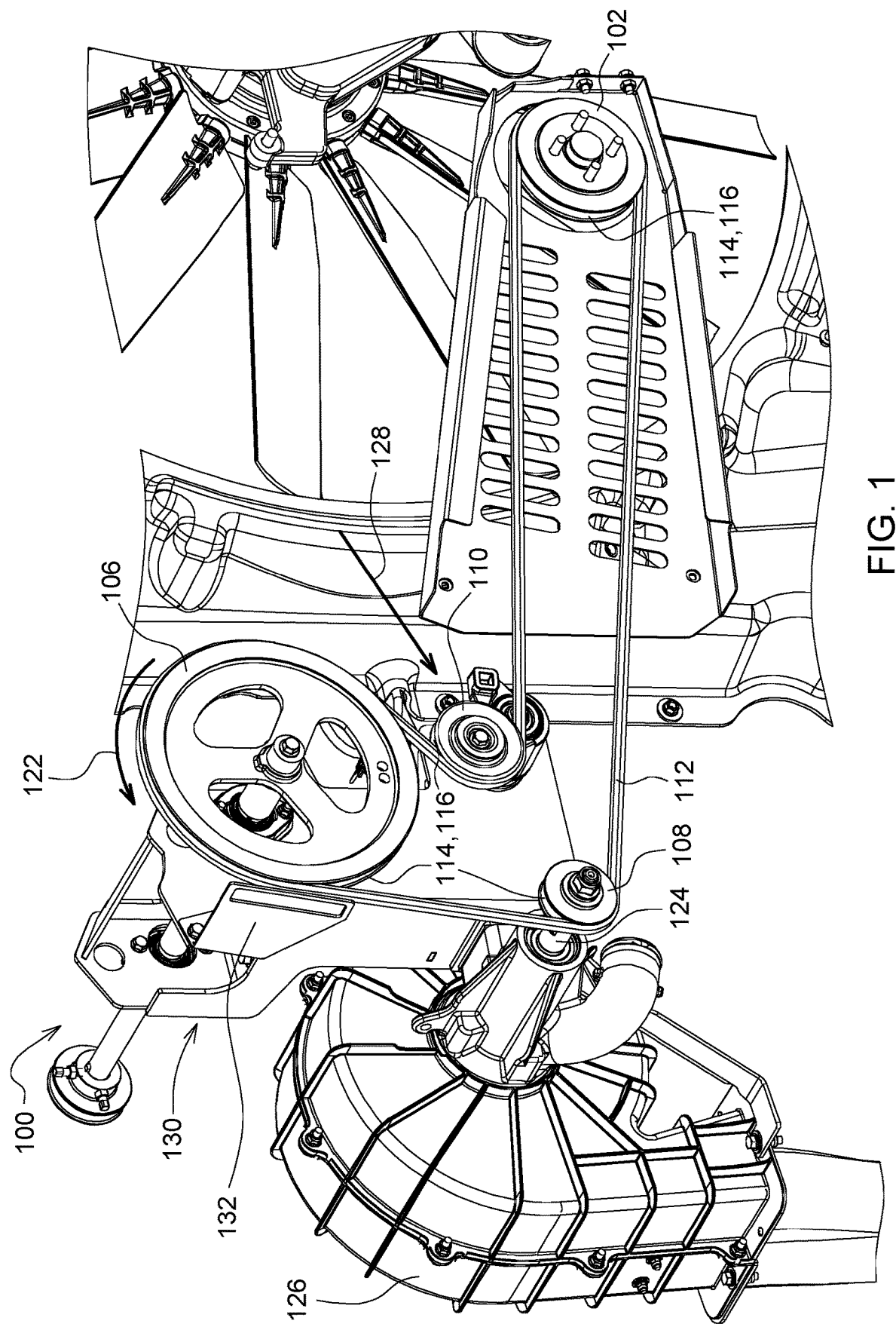
FIG. 1 is a perspective view of an example belt drive system, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems, methods, and apparatuses that reduce or eliminate damage associated with a failed (e.g., broken) drive belt in a belt drive system occurring during operation of the belt drive system. The present disclosure is applicable to many types of belt drive systems, particularly in the agricultural industry. However, the scope of the present disclosure is not limited to agricultural applications but, rather, can be used in any belt drive application.

Belt drive systems are used to transmit motion, for example, from a drive pulley to one or more driven pulleys. Belt drive systems may also be used to alter an operating speed of or a torque imparted to a driven pulley, for example, based on the relative sizes between the drive pulley and the driven pulley or pulleys. Belt drive systems include an endless belt (interchangeably referred to as a "drive belt"). During the course of operation of a belt drive system, the drive belt may fail, such as in response to wear or damage, causing the belt to sever. Ends of the severed drive belt can depart from the path defined by the continuous drive belt and move chaotically, thrashing about in any number of directions. This chaotic movement can cause the severed drive belt to contact components of the drive belt system or other objects in the vicinity of the drive belt system, such as a motive device (e.g., an engine or motor) used to operate the drive pulley. As a result, a severed drive belt can cause damage to those objects into which the severed drive belt comes into contact.

The present disclosure describes belt traps located at one or more locations along a circuitous route defined by the continuous drive belt in a belt drive system, such as one or more locations associated with a biased pulley, such as a tensioner pulley. Inclusion of one or more belt traps, as described herein, may eliminate or reduce the risk of damage to the belt drive system or other object adjacent to the belt drive system by unconstrained motion of a severed drive belt during operation of the belt drive system.

FIG. 1 is a perspective view of an example belt drive system 100 included in a combine harvester. However, as explained earlier, the scope of the present disclosure is not limited to agricultural applications. The belt drive system 100 includes a drive pulley 102; driven pulleys 106 and 108; a tensioner pulley 110; and a drive belt 112 defining a circuitous route. The drive belt 112 is received into grooves 114 formed into peripheral edges 116 of each of the drive pulley 102, driven pulleys 106 and 108, and tensioner pulley 110. Rotation of the drive pulley 102 causes the drive belt 112 to move along the circuitous route, causing the driven pulleys 106 and 108 and tensioner pulley 110 to rotate in response. In this example, the drive pulley 102 is rotated in the direction of arrow 122. The driven pulley 108 is coupled to a shaft 124 of a fan 126, thereby causing the fan to operate. The tensioner pulley 110 is biased in the direction of arrow 128 and imparts a force to the drive belt 112 that increases a frictional force between the pulleys and the drive belt 112 as well as to generate tension in the drive belt 112.

The belt drive system 100 also includes a belt trap 130 located at a location along the drive belt 112 to arrest or otherwise absorb kinetic energy of the drive belt 112 when the drive belt 112 fails, e.g., breaks, during operation of the belt drive system 100. Although the drive belt system 100 is shown with a single belt trap 130, other belt traps 130 can be included at one or more other locations along the drive belt 112.

Figure 2:
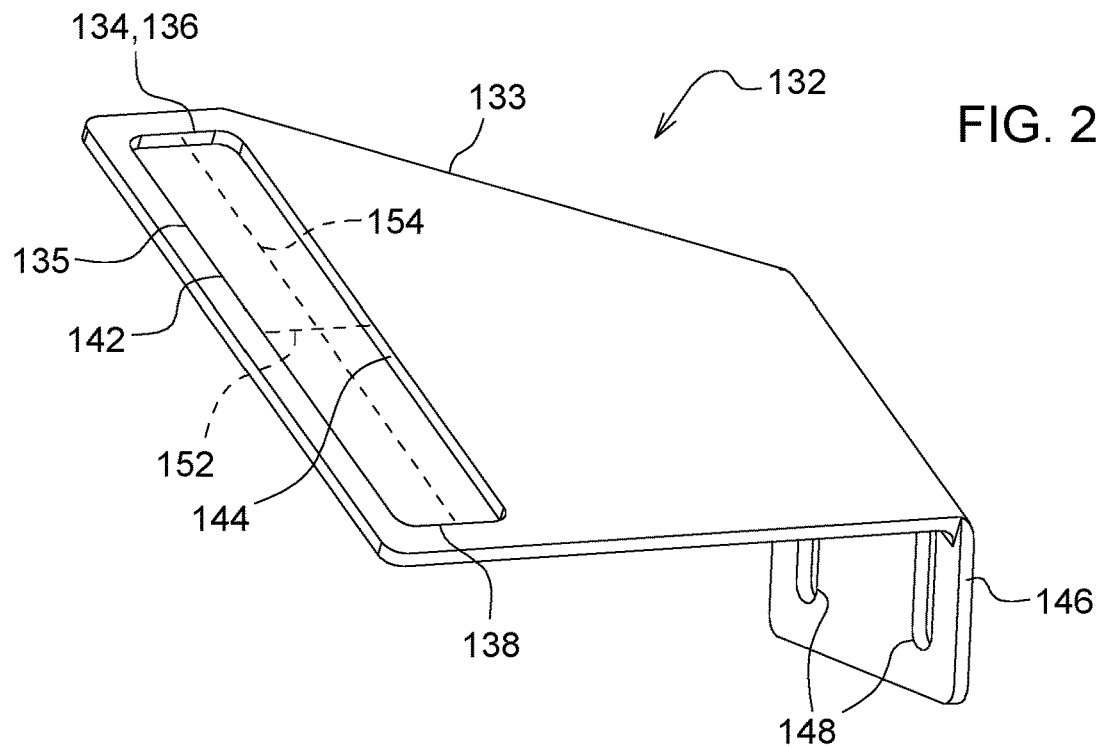
FIG. 2 is an oblique view of an example bracket that forms part of an example belt trap, according to some implementations of the present disclosure.
Figure 3:
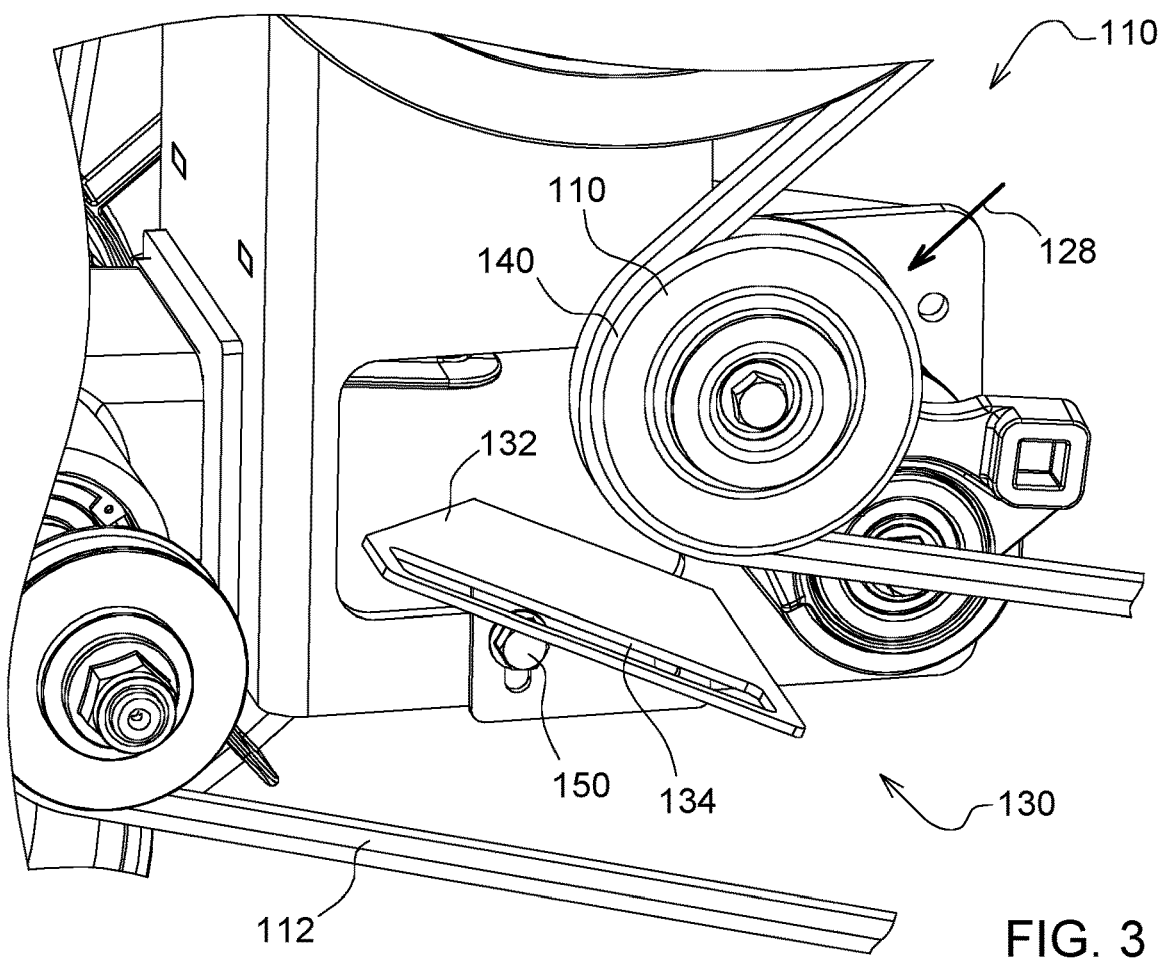
FIG. 3 is an oblique view of an example belt trap of an example belt drive system in which the belt trap includes the bracket of FIG. 2.

In the illustrated example, the belt trap 130 is a combination of the tensioner pulley 110 and a bracket 132 located adjacent to the tensioner pulley 110. The example bracket 132 is shown in greater detail in FIGS. 2 and 3. Referring to FIGS. 2 and 3, the bracket 132 includes a first wall 133 into which a relief portion 134 is formed. In some implementations, the relief portion 134 defines a pocket into which a portion of the tensioner pulley 110 is received upon failure of the drive belt 112. An example bracket that includes a pocket to receive a portion of a tensioner pulley is described below in the context of FIG. 15. In other implementations, the relief portion 134 forms an opening or a recess, such as a recess formed in a peripheral edge of the bracket 132, shown, for example, in FIG. 8. Various examples of relief portions within the scope of the present disclosure are described in the context of various example brackets contained herein. In the illustrated example, the relief portion 134 is in the form of an opening 135 formed in the first wall 133.

The relief portion 134 defines a minor axis 152 corresponding to a width of the opening 135 and a major axis 154 corresponding to a length of the opening 135. In this example, the length of the opening 135 is greater than a width of the opening 135. Thus, the length of the major axis 154 is larger than a length of the minor axis 152. In the illustrated example, the major axis 154 and the minor axis 152 are perpendicular to each other. In other implementations, the axes 154 and 152 may not be perpendicular to each other. In still other implementations, the relief portion 134 may not define a major axis and a minor axis, such as based on the nature of the shape of the relief portion 134.

As explained earlier, the tensioner pulley 110 is biased in the direction of arrow 128 (shown in FIGS. 1 and 3), and upon failure (e.g., severance) of the drive belt 112, the tensioner pulley 110 reacts to move in the direction of arrow 128 in response to the biasing force. Thus, the tensioner pulley is movable between a first position corresponding to an operational configuration in which the tensioner pulley 110 applies a load on the drive belt 112 to generate tension in the drive belt 112 and a second position corresponding to an arresting configuration. This first position of the tensioner pulley 110 may actually be a range of positions as the position of the tensioner pulley 110 may vary during normal operation of the belt drive system in response to movement of the drive belt 112. The tensioner pulley 110 moves into the second position upon failure of the drive belt 112 (e.g., severance) in response to the biasing force applied to the tensioner pulley to maintain tension in the drive belt 112. In the second position, the tensioner pulley 110 cooperates with the bracket 132 to arrest the failed drive belt 112 or otherwise absorb energy of the drive belt 112. In some instances, the tensioner pulley 110 physically engages with one or more portions of the bracket 132 when the tensioner pulley 110 moves into the second position. Consequently, movement of the tensioner pulley 110 into the second position corresponds to placing the tensioner pulley 110 into an arresting configuration to arrest movement of the failed drive belt 112 or otherwise absorb some portion of the energy of the failed drive belt 112. In some implementations, the second position may include a range of positions in which the tensioner pulley 110 may reside (e.g., come to rest) when the tensioner pulley 110 is driven towards the bracket 132 in response to the biasing force.

As a result, a portion of the tensioner pulley 110 is received into the relief portion 134 capturing the drive belt 112 between the tensioner pulley 130 and the bracket 132. For example, the drive belt 112 may be captured between an edge 136 or edge 138 or both of the bracket 132 and a peripheral edge 140 of the tensioner pulley 110. These edges 136 and 138 are defined by the relief portion 134. The edges 136 and 138 are parallel to the minor axis 152. In some implantations, the edges 136 and 138 may not be parallel. Although the illustrated edges 136 and 138 are linear, in other implementations, one or both of the edges 136 and 138 may be curved or otherwise nonlinear.

In other implementations, the drive belt 112 may be captured between other portions of the tensioner pulley 110 and the bracket 132. For example, the drive belt 112 may be captured between the tensioner pulley 110 (e.g., the peripheral edge 140 of the tensioner pulley 110) and one or more of the edges 142 and 144 defined by the relief portion 134.

The bracket 132 includes a second wall 146 that is angled relative to the first wall 133. The angle defined by the first and second walls 133 and 146 can be any desired angle. The second wall 146 includes apertures 148, which are in the form of slots in the illustrated example. Slots allow for adjusting a position of the bracket relative to the belt drive system 100, such a distance from the tensioner pulley 110. Fasteners 150, such as bolts, screws, rivets, or other types of fasteners, are received into the apertures 148 for mounting the bracket 132 at a desired location.

Figure 4:
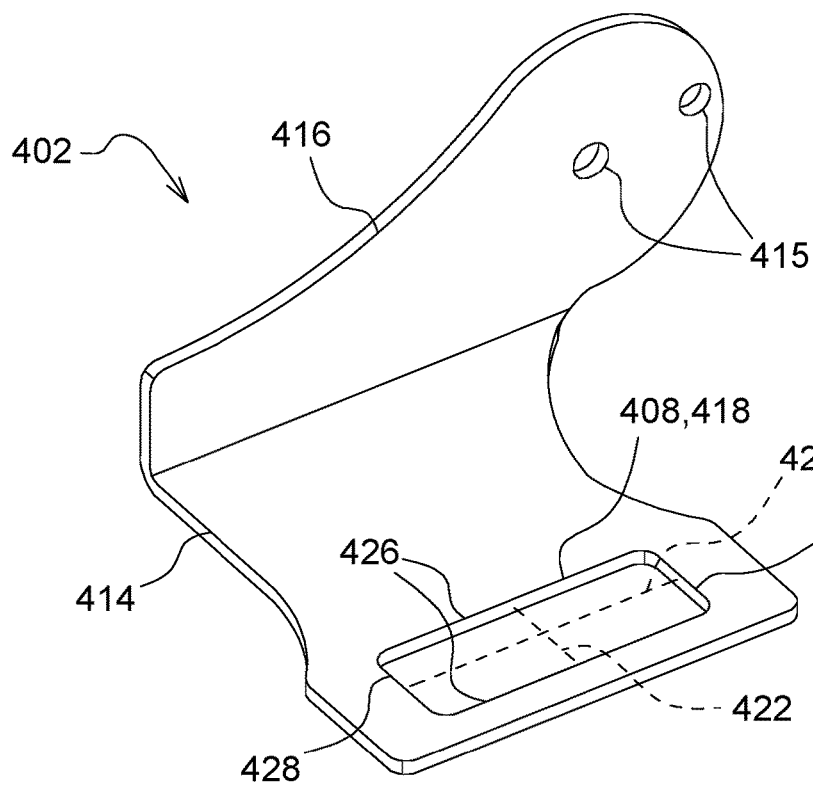
FIG. 4 is an oblique view of another example bracket that forms part of a belt trap, according to some implementations of the present disclosure.
Figure 5:
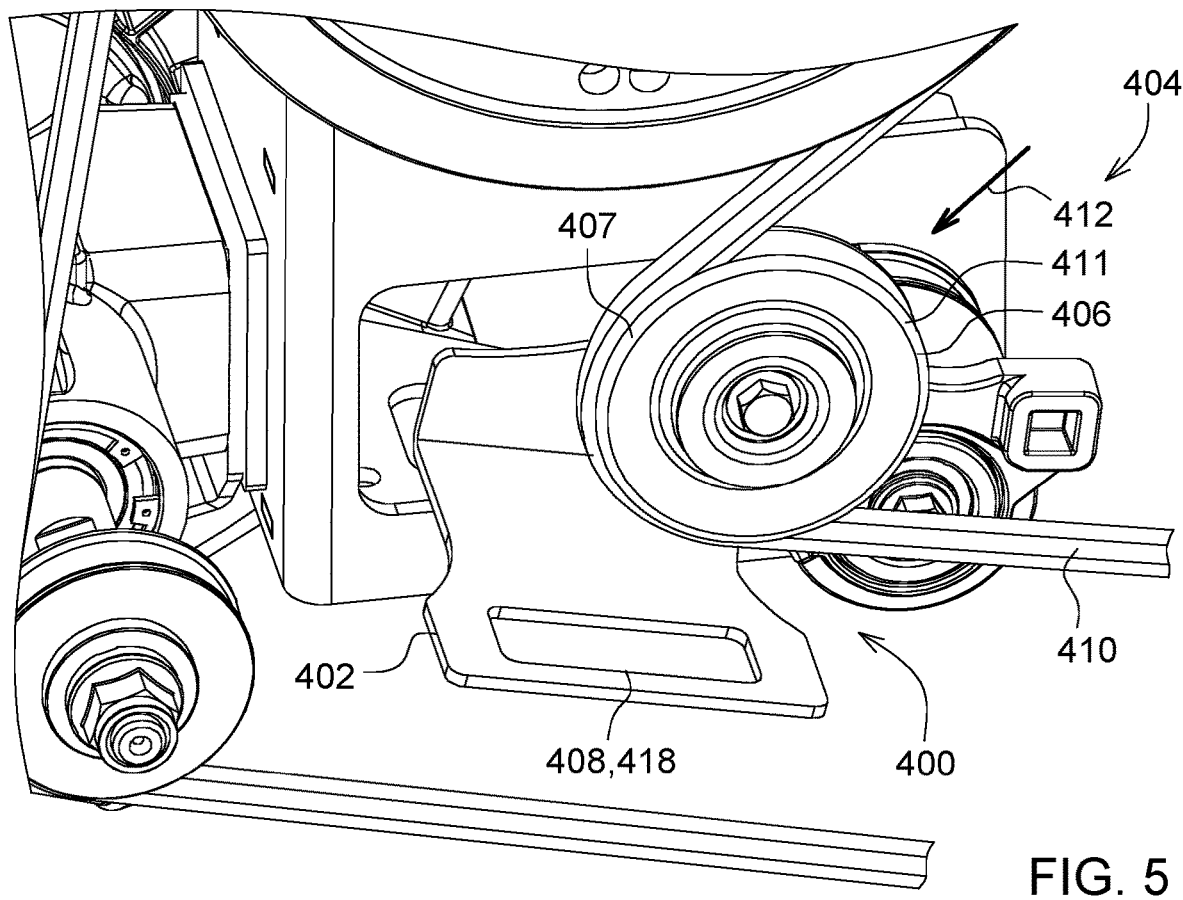
FIG. 5 is an oblique view of an example belt trap of a belt drive system in which the belt trap includes the bracket of FIG. 4.

FIGS. 4 and 5 illustrate another example belt trap 400 and associated bracket 402. The bracket 402 is similar to the bracket 132 and, as shown in FIG. 5, is positioned in a belt drive system 404 relative to a tensioner pulley 406 such that a portion of the tensioner pulley 406 is received into a relief portion 408 of the bracket 402 upon failure (e.g., severance) of a drive belt 410. The belt drive system 404 may be similar to the belt drive system 100. The drive belt 410 is received into a groove 411 formed in a peripheral edge 407 of the tensioner pulley 406. Similar to the tensioner pulley 110, the tensioner pulley 406 is biased in a direction of arrow 412 such that failure of the drive belt 410 causes the tensioner pulley 406 to move in the direction of arrow 412, causing the drive belt 410 to be captured between the tensioner pulley 406 and a portion of the bracket 402, such as one or more of the edges defining the relief portion 408.

FIG. 4 illustrates the bracket 402. The bracket 402 includes a first wall 414 and a second wall 416 extending at an angle relative to the first wall 414. The angle defined by the first and second walls 414 and 416 can be any desired angle. The second wall 416 functions to mount the bracket 402 at a desired location, such as a location adjacent to the tensioner pulley 406, as shown, for example, in FIG. 5. The second wall 416 includes apertures 415 that receive fasteners, such as screw or bolts, to secure the bracket 402 in place.

The relief portion 408 is in the form of an opening 418 formed in the first wall 414. The opening 418 is in the form of a rectangle. However, the opening 418 could have other shapes, e.g., elliptical. For example, the opening 418 of the relief portion 408 may be any size or shape designed to engage with the tensioner pulley 406 to trap the drive belt 410 upon failure of the drive belt 410. For example, the opening 418 and, hence, the relief portion 408, is sized and shaped to receive a portion of the tensioner pulley 406, such as upon failure of the drive belt 410.

The relief portion 408 defines a major axis 420 and a minor axis 422. Similar to the bracket 132, a length of the major axis 420 is greater than a length of the minor axis 422. The relief portion 408 also defines first edges 426 and second edges 428. In this example, the first edges 426 are parallel and extend parallel to the major axis 420, and the second edges 428 are parallel and extend parallel to the minor axis 422. In other implementations, the first edges 426 may not be parallel, and the second edges 428 may not be parallel. Still further, in some implementations, one or more of the edges 426 and 428 may be curved or otherwise nonlinear. One or more of the edges 426 and 428, in combination with a tensioner pulley (e.g., tensioner pulley 406), may be used to capture a failed drive belt between the one or more edges 426 and 428 and the tensioner pulley 406, such as the peripheral edge 407 of the tensioner pulley 406. In other implementations, a failed (e.g., severed) drive belt 410 may be captured between another portion of the bracket 402 and the tensioner pulley 406.

In the illustrated example, the major axis 420 and the minor axis 422 are perpendicular to each other. In other implementations, the axes 420 and 422 may not be perpendicular to each other. In still other implementations, the relief portion 408 may not define a major axis and a minor axis due to the nature of the shape of the relief portion 408.

FIGS. 6 and 7 show another belt trap 600 and associated bracket 602. The bracket 602 is formed with wireframe construction (e.g., formed of a continuous wire or a combination two or more continuous wires that are bent into the illustrated shape or another wireframe shape that is operable to engage with a tensioner pully to trap a failed drive belt). The bracket 602 includes a relief portion 604 defining an opening 606 and a mounting portion 608 used to position the bracket 602 at a selected location relative to a tensioner pulley, such as tensioner pulley 610. An angle defined between the relief portion and the mounting portion 608 can be any desired angle. The mounting portion 608 defines an opening 612. However, in other implementations, the mounting portion 608 can have any size or shape to provide for mounting the bracket 602 at a desired location. The opening 612 of the mounting portion 608 is sized and shaped to receive one or more fasteners, such as fasteners 613 shown in FIG. 7, to secure the bracket 602 at a desired location.

As mentioned, the relief portion 604 defines the opening 606, which has a rectangular shape. However, in other implementations, the opening 606 may have another shape that cooperates with the tensioner pulley 610 to trap a failed (e.g., severed) drive belt, such as drive belt 614. The opening 606 defines a major axis 616 and a minor axis 618. A length of the major axis 616 is greater than a length of the minor axis 618. In the illustrated example, the major axis 616 and the minor axis 618 are perpendicular to each other. In other implementations, the axes 616 and 618 may not be perpendicular to each other. In still other implementations, the relief portion 604 may not define a major axis and a minor axis due to the nature of the shape of the relief portion 604.

The relief portion 604 defines edges 620 that extend parallel to the major axis 616 and edges 622 that extend parallel to the minor axis 618. In the illustrated example, the edges 620 are parallel to each other and the edges 622 are parallel to each other. In other implementations, the edges 620 may not be parallel to each other, the edges 622 may not be parallel to each other, or both. In some implementations, or more of the edges 620 and 622 may be curved or otherwise nonlinear.

FIG. 7 illustrates a belt drive system 619 that is similar to belt drive system 100 and 404. The belt drive system 619 includes a tensioner pulley 624 and the continuous drive belt 614 received into a groove 626 formed in a peripheral edge 628 of the tensioner pulley 624. The tensioner pulley 624 is biased in the direction of arrow 630, causing the drive belt 614 to be placed in tension. The bracket 602 is disposed adjacent to the tensioner pulley 624 such that, upon failure (e.g., severance) of the drive belt 614, the tensioner pulley 624 moves in the direction of arrow 630 to capture drive belt 614 between one or more of the edges 620 and 622 of the bracket 602 and a portion of the tensioner pulley 624, such as the peripheral edge 628 of the tensioner pulley 624.

Figure 8:
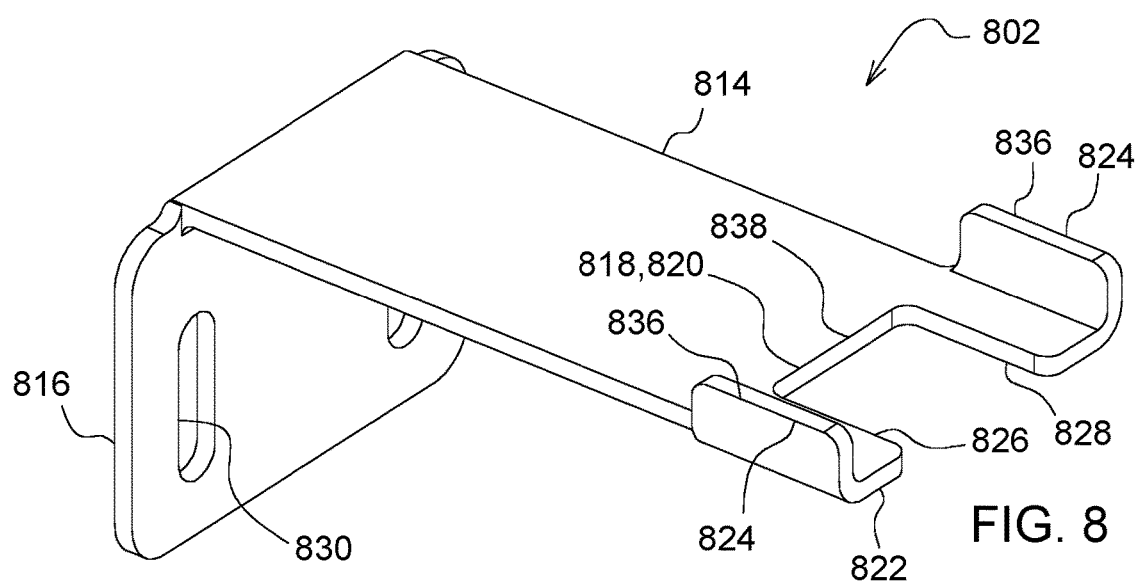
FIG. 8 is an oblique view of another example bracket that forms part of a belt trap, according to some implementations of the present disclosure.
Figure 9:
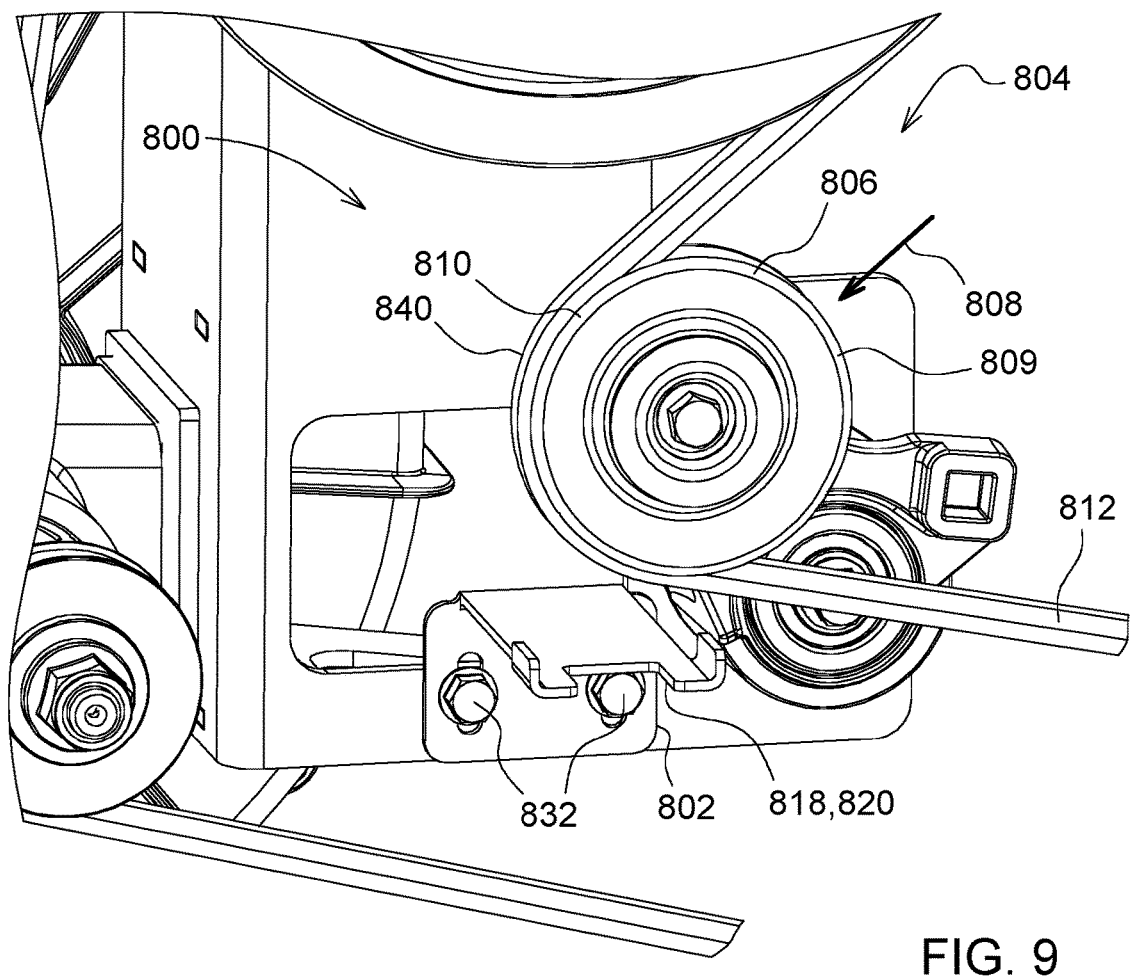
FIG. 9 is an oblique view of an example belt trap of a belt drive system in which the belt trap includes the bracket of FIG. 8.

FIGS. 8 and 9 show another example belt trap 800 and associated bracket 802 for use in a belt drive system 804, that may be similar to the belt drive systems 100, 404, or 619. Referring to FIG. 9, the belt drive system 804 includes a tensioner pulley 806 that is biased in the direction of arrow 808. The tensioner pulley 806 includes a groove 809 formed in a peripheral edge 810 of the tensioner pulley 806. A continuous drive belt 812 is received into the groove 808, and the tensioner pulley 806 imparts tension into the drive belt 812. The bracket 802 is positioned adjacent to the tensioner pulley 806 and, together, form the belt trap 800. When the drive belt 812 fails, such as by severance, the tensioner pulley 806 moves in the direction of arrow 808 to trap the drive belt 812 between the tensioner pulley 806 and the bracket 802.

Referring to FIG. 8, the bracket 802 includes a first wall 814 and a second wall 816. The walls 814 and 816 define an angle therebetween. The angle defined by the first and second walls 814 and 816 can be any desired angle. A relief portion 818 is formed in the first wall 814. The relief portion 818 defines a recess 820 formed in a peripheral edge 822 of the first wall 814. In other implementations, the recess 820 may be omitted and replaced with an opening similar to the opening 135 and 418. The bracket 802 also includes tabs 824 disposed adjacent to opposing edges 826 and 828 of the recess 820. In the illustrated example, the tabs 824 extend perpendicularly from the first wall 814. In other implementations, the tabs 824 extend from the first wall 814 at an oblique angle. The second wall 816 is used to mount the bracket 802 at a desired location, such as at a location adjacent to the tensioner pulley 806. The second wall 816 includes apertures 830. Fasteners, such as fasteners 832 shown in FIG. 9, are used to secure the bracket at a desired location, such as adjacent to the tensioner pulley 806. Example fasteners include bolts, screws, or rivets. The apertures 830 form slots that can be used to adjust a distance between the bracket 802 and the tensioner pulley 806.

In the illustrated example the tabs 824 extend from and are oriented at an angle relative to the first wall 814. In this example, the first wall 814, the second wall 816, and the tabs 824 are formed form a single piece of material (such as a portion of sheet metal) and, thus, form a unitary component. In other implementations, one or more of the first wall 814, second wall 816, or the tabs 824 may form a separate component that is attached to form part of the bracket 802.

In operation, when the drive belt 812 fails, the tensioner pulley 806 moves towards the bracket 802 to trap the failed drive belt 812. The recess 820 of the relief portion 818 is sized and shaped to receive a portion of the peripheral edge 810 of the tensioner pulley 801 so that other portions of the peripheral edge 810 can engage with edges 836 of the tabs 824 to capture the drive belt 812 therebetween. In some instances, the drive belt 812 may be captured between a single tab 824 and the peripheral edge 810 of the tensioner pulley 806. In other instances, the drive belt 812 is captured between both tabs 824 and the tensioner pulley 806. In still other instances, the drive belt 812 may be captured between another part of the bracket 802, such as edge 838 of the relief portion 818 (which also defines part of the recess 820), and the peripheral edge 810 or side 840 of the tensioner pulley 806.

Figure 10:
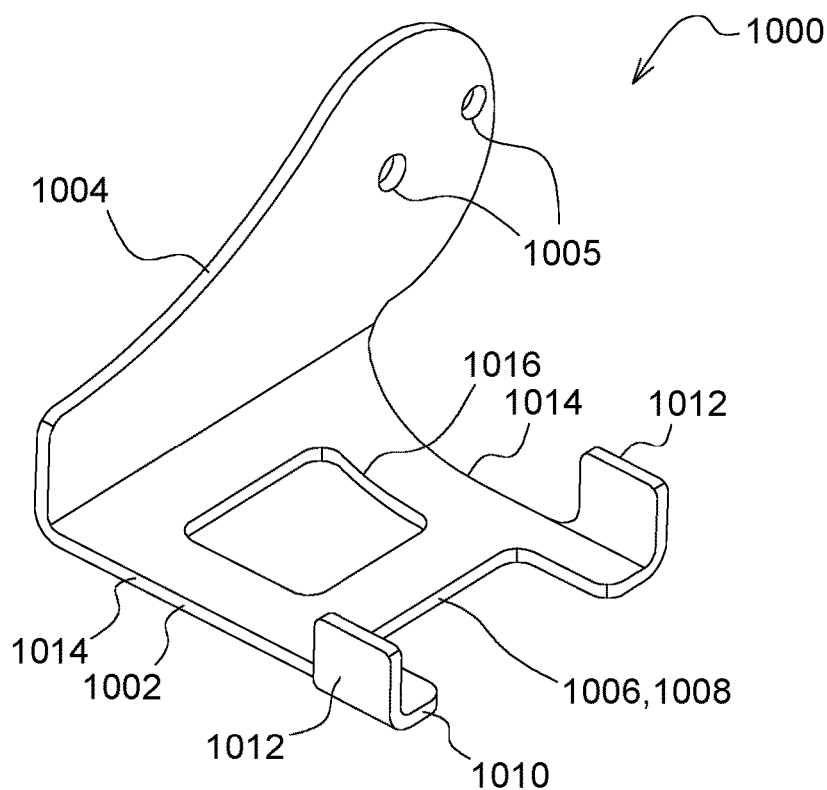
FIG. 10 is an oblique view of another example bracket that forms part of a belt trap, according to some implementations of the present disclosure.

FIG. 10 is an oblique view of another example bracket 1000 of a belt trap as described herein. The bracket 1000 includes a first wall 1002 and a second wall 1004 that are angled relative to each other. The angle defined between the first wall 1002 and the second wall 1004 can be any desired angle. The second wall 1004 operates to mount the bracket 1000, such as to position the bracket 1000 in a belt drive system adjacent to a tensioner pulley. The second wall 1004 includes apertures 1005 that are configured to receive fasteners to secure the bracket 1000 into position. In other implementations, the second wall 1004 may be omitted, and the bracket 1000 may be mounted in another way. The first side 1002 includes a relief portion 1006. The relief portion 1006 includes a recess 1008 formed in a peripheral edge 1010 of the first wall 1002. In other implementations, the recess 1008 may be replaced with an opening similar to the opening 135 or 418. The bracket 1000 also includes tabs 1012 extending from opposing edges 1014 of the first wall 1002 on opposing sides of the recess 1008. In the illustrated example, the tabs 1012 extend perpendicularly from the first wall 1002. In other implementations, the tabs 1012 extend from the first wall 1002 at an oblique angle.

Similar to the tabs 824 and the relief portion 818, the tabs 1012 and relief portion 1006 function to capture a failed drive belt. The recess 1008 of the relief portion 1006 is sized and shaped to receive a portion of a peripheral edge of a tensioner pulley, and the tabs 1012 are positioned to engage with the peripheral edge of the tensioner pulley to capture the drive belt between at least one of the tabs 1012 and the tensioner pulley. The first wall 1002 also includes an opening 1016. In some instances, the opening 1016 is included to reduce the mass of the bracket 1000. In other implementations, the opening 1016 may be omitted.

Figure 11:
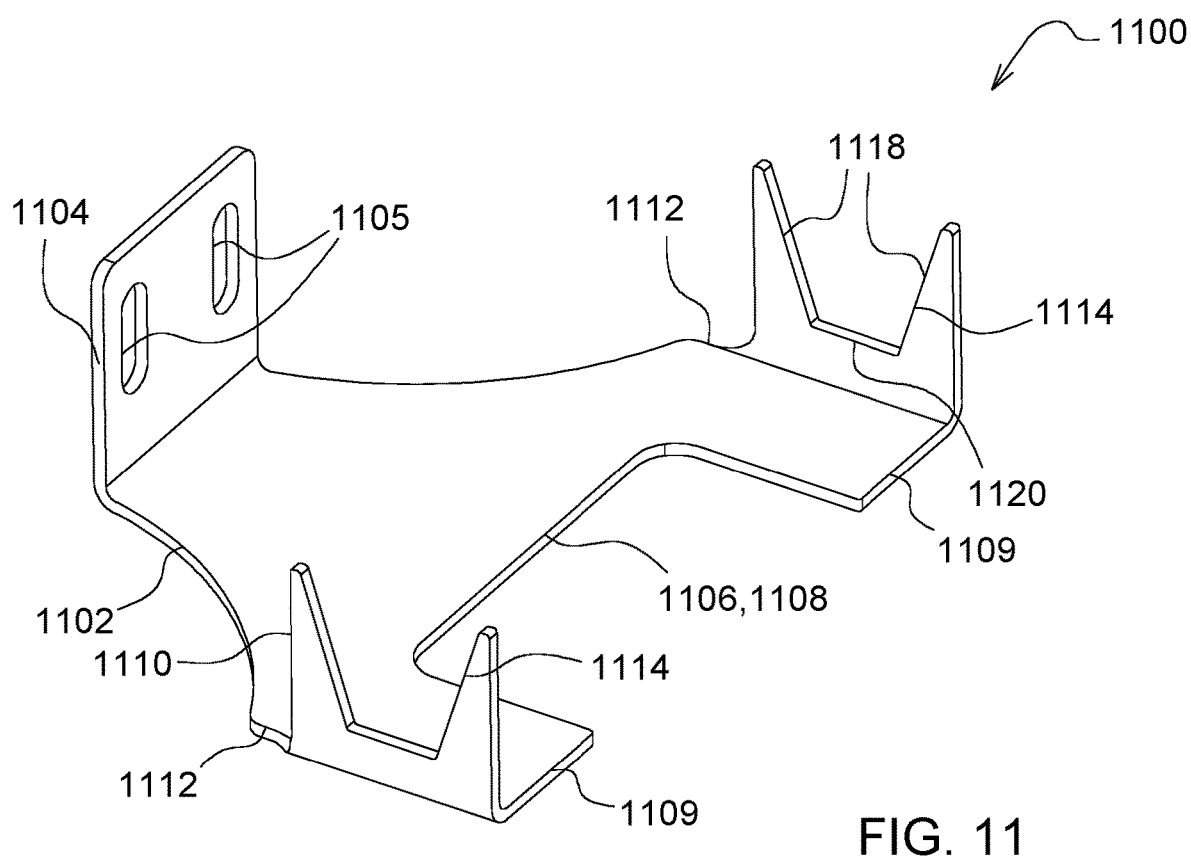
FIG. 11 is an oblique view of another example bracket that forms part of a belt trap, according to some implementations of the present disclosure.

FIG. 11 is an oblique view of another example bracket 1100 that forms part of a belt trap of belt drive system similar to those described herein. The bracket 1100 includes a first wall 1102 and a second wall 1104. Similar to the other brackets, the second wall 1004 is used to attach the bracket 1100 at a desired location, such as at a location adjacent to a tensioner pulley of a belt drive system. The second wall 1004 includes apertures 1005 used to receive fasteners to mount the bracket into position. The first side 1102 includes a relief portion 1106. The relief portion 1106 is in the form of a recess 1108 extending from a peripheral edge 1109 of the first wall 1102. In other implementations, the recess 1108 may be omitted and replaced with an opening similar to opening 135 or 418.

Further, similar to the other brackets described herein, the configuration of the first and second walls 1102 and 1104 may vary. For example, the illustrated example shows the first and second walls 1102 and 1104 being disposed perpendicular to each other. In other implementations, the orientation of the first and second walls 1102 and 1104 can vary. For example, in some instances, the first and second walls 1102 and 1104 may have an orientation that defines an oblique angle. However, an angle defined between the first wall 1102 and the second wall 1104 may be any desired angle. In some implementations, the second wall may be omitted, and the first wall 1102 may be used to mount the bracket 1100. In still other implementations, the bracket 1100 may have one or more additional or other features, and one or more of such features may be used to mount the bracket 1100 at a desired location. Other brackets within the scope of the present disclosure may be similarly configured.

Figure 12:
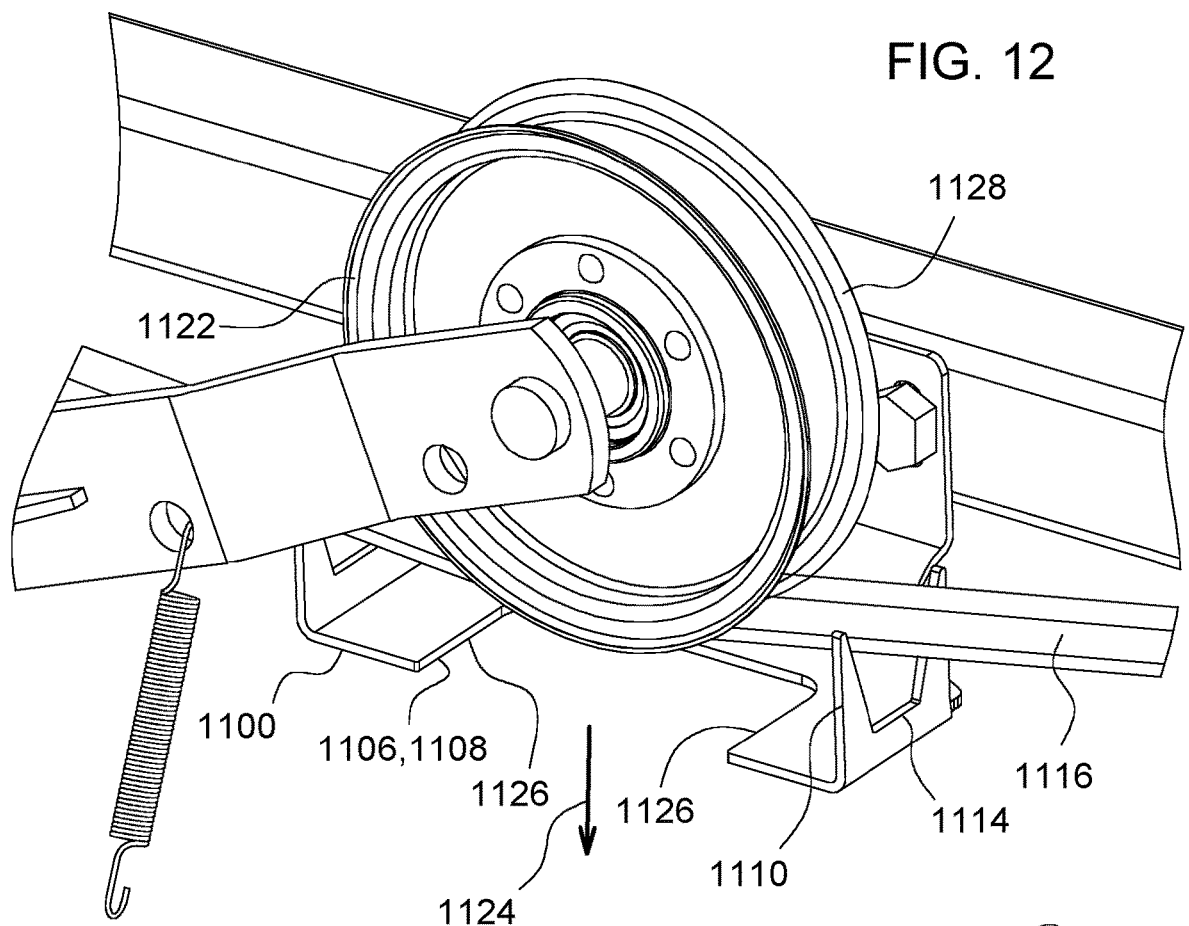
FIG. 12 is an oblique view of an example belt trap of a belt drive system in which the belt trap includes the bracket of FIG. 11.

The bracket 1100 also includes tabs 1110 extending from edges 1112 of the first wall 1102. The tabs 1110 are positioned adjacent to opposing ends of the recess 1108. In the illustrated example, the tabs 1110 extend perpendicularly from the first wall 1102. In other implementations, the tabs 1110 extend from the first wall 1002 at an oblique angle. The tabs 1110 include notches 1114. The notches 1014 are sized and shaped to provide a passage for a drive belt (such as a drive belt 1016 shown in FIG. 12) when a tensioner pulley 1122 is at the first position corresponding to an operational configuration of the tensioner pulley 1122, as described earlier. In some implementations, with the tensioner pulley 1122 in the first position, a gap is formed between the drive belt 1116 and edges of the notches 1114 defining sides 1118 and end 1120. In some implementations, the notches 1114 include a tapered shape in which the sides 1018 converge towards the end 1120 of the notches 1114, as illustrated in FIGS. 11 and 12. In other implementations, the notches 1114 have a rectilinear shape such that the sides 1118 of the notches 1114 are parallel to each other and perpendicular to the end 1120 of the notches 1114. In other implementations, the orientation of the sides 1118 to each other and the end 1120 can be any desired configuration. In operation, when the continuous drive belt 1116 fails, the notches 1114 formed in the tabs 1110 operate to maintain the drive belt 1116 in position as the tensioner pulley 1122 moves in the direction of arrow 1124 (such as in response to a biasing force applied to the tensioner pulley 1122) to capture the drive belt 1116 between one or more edges 1126 of the relief portion 1106 and a peripheral edge 1128 of the tensioner pulley 1122.

Figure 13:
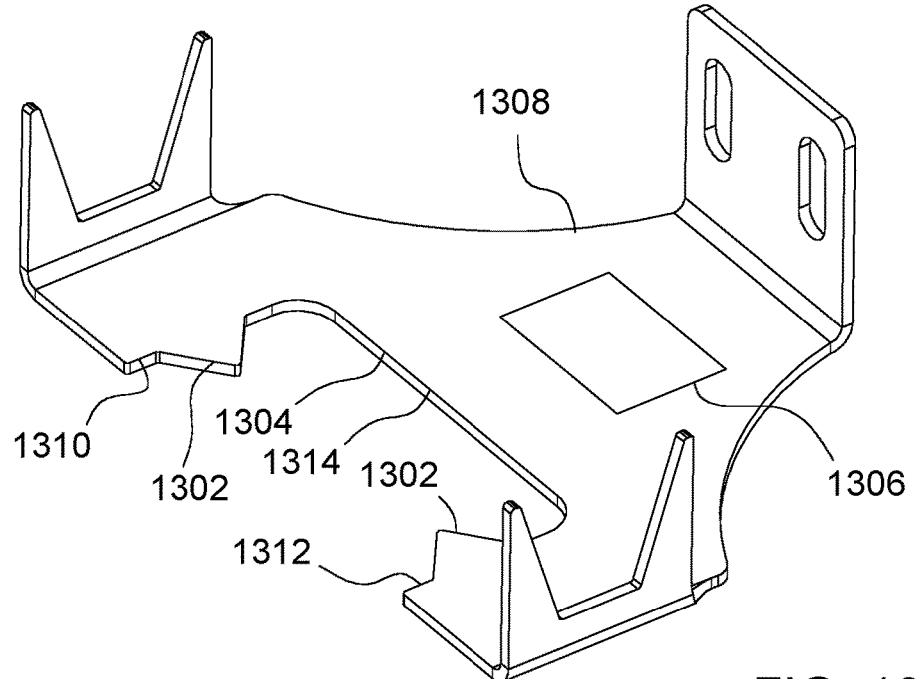
FIGS. 13 through 16 are additional example brackets that can be used in a belt trap, according to some implementations of the present disclosure.
Figure 14:
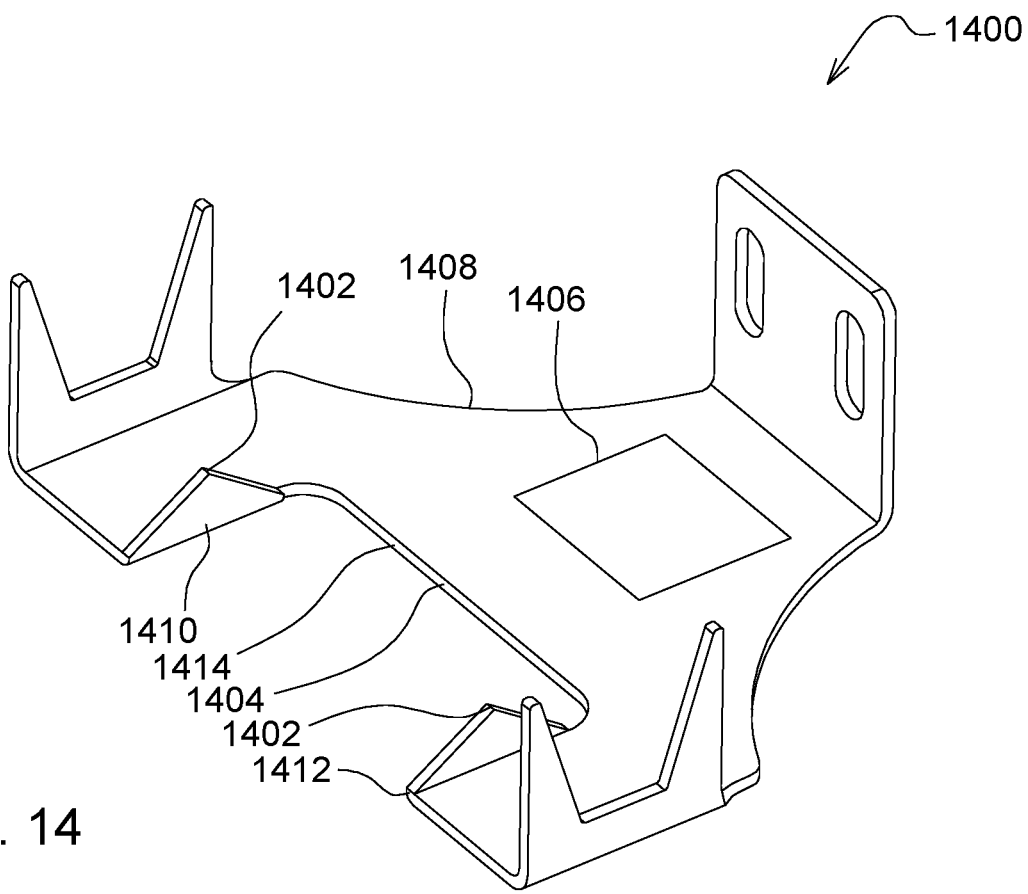

FIGS. 13 and 14 show brackets 1300 and 1400 similar to the bracket 1100 except that the brackets 1300 and 1400 includes protrusions 1302 and 1402, respectively, extending from edges defining a relief portion 1304 and 1404, respectively. Referring to FIG. 13, the protrusions 1302 are in the form of triangular spikes that extend from opposing edges 1310 and 1312 and lie in the plane 1306 defined by a first wall 1308. The protrusions 1302 are operable to engage with a failed drive belt when a tensioner pulley is displaced towards the relief portion 1304 to clamp the failed drive belt between the bracket 1300 and the tensioner pulley when the drive belt fails. In some instances, engagement, e.g., piercing, of the drive belt with one or more of the protrusions 1302, either alone or in combination with clamping between the tensioner pulley and the bracket 1300 (similar to those interactions described elsewhere herein), can capture the failed drive belt, thereby reducing damage to surrounding objects that may result from an unrestrained failed drive belt. Although protrusions 1302 in the form of triangular spikes are shown, protrusions having other forms, such as one or more forms described herein or otherwise within the scope of the present disclosure, may also be used.

Referring to FIG. 14, the protrusions 1402 are oriented perpendicularly to a plane 1406 defined by a first wall 1408. Similar to the protrusions 1302, the protrusions 1404 function to engage (e.g., pierce) a failed drive belt, and, in some instances, the protrusions 1404, either alone or in combination with clamping between a tensioner pulley and the bracket 1400 (similar to those interactions described elsewhere herein), capture the failed drive belt to prevent damage to surrounding objects that may result from an unrestrained drive belt. Also, similar to the protrusions 1302, protrusions 1402 may have shapes or forms different from the spiked form illustrated in FIG. 14. For example, one or more of the protrusions 1402 may have a form of another protrusion described herein or as otherwise within the scope of the present disclosure.

With continued reference to FIGS. 13 and 14, although protrusions are shown along opposing edges 1310 and 1312 and 1410 and 1412, one or more protrusions may be provided along edges 1314 and 1414, either alone or in combination with the protrusions 1302 and 1402, respectively.

Figure 15:
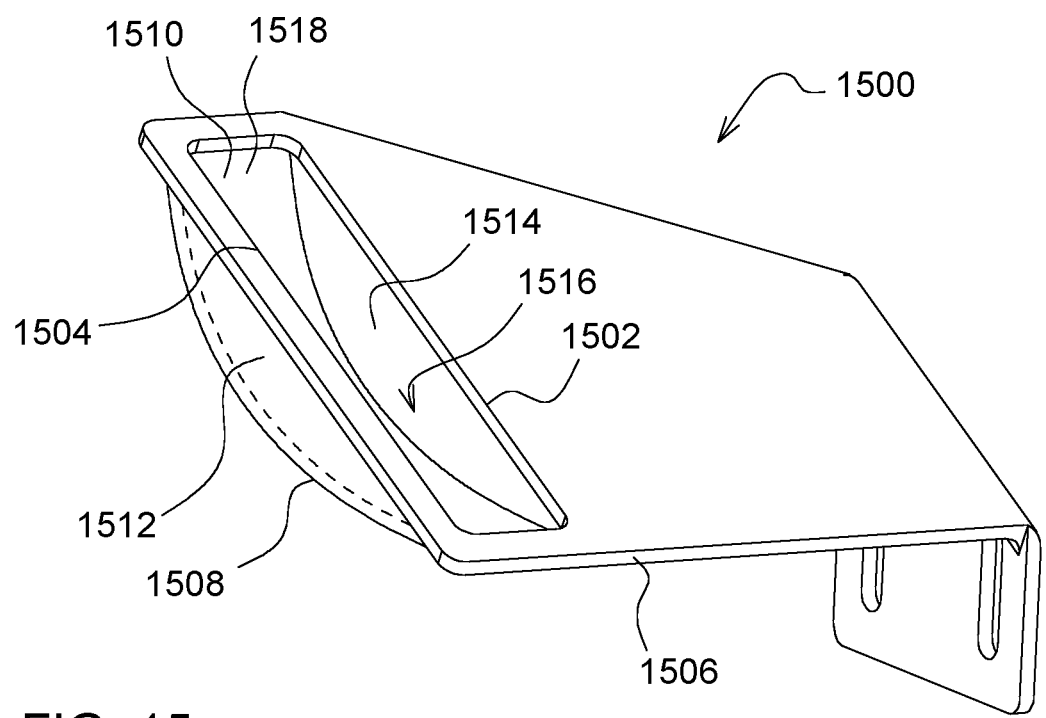

FIG. 15 is another example bracket 1500 in which a relief portion 1502 forms an opening 1504 in a first wall 1506. The bracket 1500 is similar to bracket 132 except that the relief portion 1502 also includes a shroud 1508 extending from the first wall 1506. In some instances, the shroud 1508 includes a curved wall 1510 and walls 1512 and 1514 disposed on opposing sides of the curved wall 1510. In other implementations, one or both of the walls 1512 and 1514 are omitted. In some implementations, the shroud 1508, along with the opening 1504, defines a pocket 1516. In some instances, the shroud 1508 may include one or more openings in one or more of the walls 1510, 1512, and 1514. Further, in some instances, the pocket 1516 is sized and shaped to receive a portion of a peripheral edge of a tensioner pulley. An inner surface 1518 of the shroud 1508 cooperates with the tensioner pulley to capture a failed drive belt therebetween in response to displacement of the tensioner pulley towards bracket 1500 as described herein.

Figure 16:
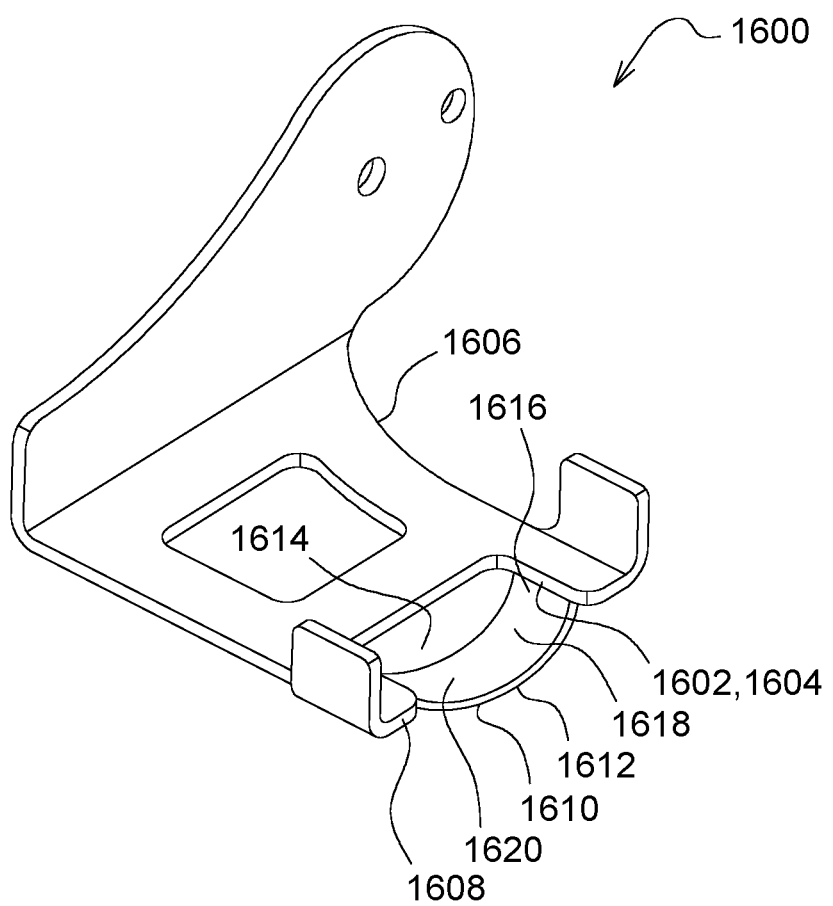

FIG. 16 is another example bracket 1600 in which a relief portion 1602 forms a recess 1604 in a first wall 1606. The recess 1604 extends from an edge 1608 of the first wall 1606. The bracket 1600 is similar to bracket 1000 except that the relief portion 1602 also includes a shroud 1610 extending from the first wall 1606. In some instances, the shroud 1610 includes a curved wall 1612 and a wall 1614 provided on a first side 1616 of the curved wall 1612. In other implementations, the shroud 1610 may include a second wall on an opposite side of the curved wall 1612. In some implementations, the wall 1614 (or the wall opposite the wall 1614, where applicable) may be omitted. In some implementations, the shroud 1610, along with the recess 1604, defines a pocket 1618. In some instances, the shroud 1610 may include one or more openings in one or more of the walls 1612 and 1614. Further, in some instances, the pocket 1618 is sized and shaped to receive a portion of a peripheral edge of a tensioner pulley. An inner surface 1620 of the shroud 1610 cooperates with the tensioner pulley to capture a failed drive belt therebetween in response to displacement of the tensioner pulley towards bracket 1600 as described herein. A shroud, which may be similar to shroud 1508 or 1610, could be applied to any bracket described herein or otherwise within the scope of the present disclosure.

Without in any way limiting the scope, interpretation, or application of the claims appearing below, a technical effect of one or more of the example implementations disclosed herein is to reduce the risk of damage to a belt drive system or objects adjacent thereto in response to failure of a drive belt. Another technical effect of one or more of the example implementations disclosed herein is reduce costs associated with failure of a drive belt by protecting components of a belt drive system and object adjacent thereto.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A belt trap comprising:
a movable pulley configured to carry an endless drive belt, the pulley rotatable about an axis of rotation; and
a bracket disposed adjacent to the pulley and defining a relief portion sized and shaped to receive at least a portion of the pulley, the pulley movable from a first position corresponding to an operational configuration to a second position corresponding to an arresting configuration in which a portion of the pulley is received into the relief portion of the bracket.

2. The belt trap of claim 1, wherein the relief portion comprises a pocket formed in the bracket.

3. The belt trap of claim 1, wherein the relief portion comprises an opening formed in the bracket.

4. The belt trap of claim 1, wherein the relief portion is a recess formed in the bracket.

5. The belt trap of claim 4, wherein the bracket defines a peripheral edge, and wherein the recess is formed in the peripheral edge.

6. The belt trap of claim 1, wherein the pulley comprises a tensioner pulley.

7. The belt trap of claim 1, wherein the pulley is biased towards the second position.

8. The belt trap of claim 1, wherein the relief portion defines a shape having a major axis and a minor axis, wherein a length of the major axis is larger than a length of the minor axis, and wherein the minor axis is parallel to the axis of rotation.

9. The belt trap of claim 1, wherein the bracket further comprises tabs disposed at opposing ends of the relief portion.

10. The belt trap of claim 9, wherein the tabs are sized to engage with a peripheral edge of the pulley when the pulley is moved into the second position.

11. The belt trap of claim 10, wherein the bracket further comprises a notch formed into at least one of the tabs.

12. The belt trap of claim 10, wherein the notch comprises a V-shape.

13. The belt trap of claim 10, wherein the notch comprises a rectilinear shape.

14. The belt trap of claim 10, wherein the notch comprises a tapered shape.

15. The belt trap of claim 1, wherein the notch is sized to receive the endless drive belt when the pulley is at the first position.

16. A belt drive system comprising:
an endless drive belt moveable along a circuitous route;
a drive pulley that drives the endless drive belt along the circuitous route; and
a belt trap comprising:
a tensioner pulley biased in a first direction by a biasing force to introduce tension in the endless drive belt and movable from a first position to a second position, the tensioner pulley comprising:
a peripheral edge; and
a groove formed in the peripheral edge that receives a portion of the endless drive belt, the tensioner pulley rotatable in a first rotational direction about an axis; and
a bracket disposed adjacent to the tensioner pulley, the bracket comprising a relief portion that receives a portion of the peripheral edge of the tensioner pulley when the endless drive belt fails so as to trap the failed endless drive belt between the tensioner pulley and the bracket.

17. The drive belt system of claim 16, wherein the tensioner pulley is movable from the first position to the second position, in response to the biasing force, upon failure of the endless drive belt and wherein a portion of the tensioner pulley is receivable into the relief portion in response to movement of the tensioner pulley to the second position upon failure of the endless drive belt.

18. The drive belt system of claim 16, wherein receipt of the tensioner pulley into the relief portion clamps the endless drive belt between the tensioner pulley and the bracket.

19. The belt trap of claim 16, wherein the bracket further comprises tabs disposed at opposing ends of the relief portion.

20. The belt trap of claim 16, wherein the tensioner pulley is movable from the first position to the second position in response to failure of the endless drive belt, wherein the bracket further comprises a notch formed into at least one of the tabs, and wherein the endless drive belt is receivable within the notch when the tensioner pulley is at the first position.

* * * * *